United States Patent
Lemay et al.

(10) Patent No.: US 9,927,562 B2
(45) Date of Patent: Mar. 27, 2018

(54) NVIS COLOR FILTER AND A LIQUID CRYSTAL DISPLAY DEVICE INCLUDING THE SAME

(71) Applicant: CEVIANS LLC, Costa Mesa, CA (US)

(72) Inventors: Eric Lemay, Laguna Niguel, CA (US); Valentina Krylova, Irvine, CA (US); Benjamin George Phipps, Long Beach, CA (US)

(73) Assignee: CEVIANS LLC, Costa Mesa, CA (US)

( * ) Notice: Subject to any disclaimer, the term of this patent is extended or adjusted under 35 U.S.C. 154(b) by 148 days.

(21) Appl. No.: 14/724,646

(22) Filed: May 28, 2015

(65) Prior Publication Data

US 2015/0369978 A1 Dec. 24, 2015

Related U.S. Application Data

(60) Provisional application No. 62/004,993, filed on May 30, 2014.

(51) Int. Cl.
*G02B 5/20* (2006.01)
*G02F 1/1335* (2006.01)
*H04N 3/09* (2006.01)

(52) U.S. Cl.
CPC ....... *G02B 5/208* (2013.01); *G02F 1/133514* (2013.01); *H04N 3/09* (2013.01); *G02F 2201/08* (2013.01); *G02F 2201/083* (2013.01); *G02F 2203/055* (2013.01); *G02F 2203/11* (2013.01)

(58) Field of Classification Search
CPC .............. G02B 5/208; G02F 1/133514; G02F 2201/08; G02F 2201/083; G02F 2203/055; G02F 2203/11; H04N 3/09
See application file for complete search history.

(56) References Cited

U.S. PATENT DOCUMENTS

| | | | |
|---|---|---|---|
| 6,100,952 A * | 8/2000 | Marvin | F21V 5/02 349/62 |
| 6,786,617 B2 | 9/2004 | Lemay et al. | |
| 7,081,991 B2 | 7/2006 | Jones et al. | |
| 7,525,611 B2 | 4/2009 | Zagar et al. | |
| 7,924,371 B1 | 4/2011 | Davis | |
| 8,628,206 B1 * | 1/2014 | Davis | G02F 1/133603 362/231 |
| 2007/0025106 A1 * | 2/2007 | Robinson | G02B 5/282 362/293 |
| 2007/0195405 A1 * | 8/2007 | Maner | G02B 26/007 359/361 |

OTHER PUBLICATIONS

Yang, K. et al., "Preparation and properties of a flexible night vision imaging system filter for avionic LED displays", J Materials Science: Materials in Electronics, Apr. 2015, vol. 26, Issue 4, pp. 2222 to 2229, published online Jan. 10, 2015.

* cited by examiner

*Primary Examiner* — Huyen Ngo
(74) *Attorney, Agent, or Firm* — Knobbe, Martens, Olson & Bear LLP

(57) ABSTRACT

A night vision imaging system (NVIS) compatible liquid crystal display (LCD) includes a backlight and an LCD panel. The LCD panel includes a color filter including a plurality of colored pixels. Each of the colored pixels in the plurality of colored pixels incorporates a near infrared (NIR) filter, capable of substantially blocking emissions from the backlight, including NIR emission between 650 nm and 930 nm, while maintaining high transmission of bands of visible light for producing a full color visual image.

11 Claims, 5 Drawing Sheets

NVIS COLOR FILTER AND A LIQUID CRYSTAL DISPLAY DEVICE INCLUDING THE SAME

CROSS-REFERENCE TO RELATED APPLICATIONS

This application claims the benefit of priority under 35 U.S.C. § 119(e) to U.S. Provisional Application No. 62/004,993 filed May 30, 2014, entitled "NVIS COLOR FILTER AND A LIQUID CRYSTAL DISPLAY DEVICE INCLUDING THE SAME," which is hereby incorporated by reference herein in its entirety.

BACKGROUND

Field of the Invention

This disclosure relates to night vision imaging systems (NVIS), and particularly to liquid crystal displays (LCD) for use with night vision imaging systems.

Description of Related Art

Pilot-aircraft interface is a major component of aerospace design. A pilot must be able to quickly determine flight critical information such as, but not limited to, location, altitude, engine status, and fuel level. This is especially true for pilots flying aircraft which not only face extreme conditions but that have additional situational awareness requirements that require the pilot's attention during night missions while wearing night vision goggles. Such requirements include, but are not limited to, weapon systems management, search and rescue and safety concerns relating to the constant awareness of other aircraft.

Liquid crystal displays (LCD), such as active-matrix liquid crystal displays (AMLCD), provide excellent image quality and low power consumption while being thin and lightweight. In light of these advantages the LCD has become a preferred display device used in specialized civil and military aircrafts. During flight operation at night, LCDs are used with night vision imaging systems (NVIS). Pilots wear near infrared sensitive NVIS goggles which allow them to maintain proper night vision sensitivity. However, conventional LCD devices emit energy in the NVIS sensitive region, which causes near infrared sensitive goggles to "bloom," greatly reducing their effectiveness. To use NVIS systems during nighttime operations, the cockpit LCD devices must be compatible with NVIS systems.

Currently there are two employed strategies to achieve NVIS compatibility for an LCD device. One approach involves the use of an NVIS backlight together with a normal mode backlight and provides a dual mode display. Such dual mode NVIS displays have high manufacturing costs associated with the production and assembly of a complex backlight panel.

Another common strategy is to use an external NVIS filter that blocks red and near-infrared radiation from a normal mode backlight. These include NVIS absorptive glass, thin film dichroic coatings and NVIS polymeric filters. An NVIS filter can be mounted on either of the two surfaces of an LCD panel (front or rear). Such filters are costly and add to the face height of a display device. Also, the conventional absorptive NVIS filters have low visible light transmission (VLT) of less than 30% and cut the red from the color spectrum limiting the displays color gamut. These NVIS filters often have to be disassembled from a display during daylight operation due to low luminance and reduced color purity of the display.

Accordingly, a desire exists for an inexpensive NVIS solution for an LCD display that provides NVIS compatibility, does not interfere with full color LCD performance, and does not reduce luminance of a display. Further, an NVIS solution that does not require the introduction of structural modifications to the LCD device assembly or the addition to the total thickness of the LCD device can be beneficial.

SUMMARY

Certain embodiments of the present disclosure are directed to a night vision imaging system (NVIS) compatible liquid crystal display (LCD) that does not require an external optical filter or NVIS compatible backlight for NVIS compliance. The NVIS compatible LCD of various embodiments incorporates a near infrared (NIR) filter directly into the LCD color filter. In some embodiments, the LCD display provides a NVIS compliant full color spectral output by controlling color and brightness of the incident light, while at the same time attenuating NIR emission from the backlight. In some such embodiments, the NVIS LCD satisfies the night vision requirements of MIL-STD-3009. LCDs produced in accordance with the present disclosure can be compatible with standard LCD manufacturing equipment.

Certain embodiments of the present disclosure are also directed to an NVIS color filter capable of substantially blocking NIR radiation, at least about 80%, received from a backlight, including NIR radiation between 650 nm and 930 nm, while maintaining high transmission, at least about 40%, of predetermined bands of visible light for producing a full color visual image. The color filter of various embodiments includes a NIR absorbing material, that selectively absorbs light in NVIS sensitive region from approximately 650 nm to 930 nm, while at the same time, has spectral characteristics in the visible part of the spectrum that allows preserving high visible light transmission (VLT) of the color filter.

Certain embodiments disclosed herein have several advantages. Some embodiments eliminate the need for an external optical filter to achieve NVIS compliance, thus simplifying the design of an NVIS compliant LCD display and eliminating additional costs associated with manufacturing and assembly of an external NVIS filter. Some embodiments provide an NVIS compatible LCD display having a visible light transmittance (VLT) value greater than the VLT of an NVIS display employing commercially available external NVIS dye based filtering technology. The improvement of the VLT is realized in various embodiments because 1) an NIR absorber is formulated differently for each primary color pixel and 2) the amounts and spectral characteristics of both visible and NIR absorbers are customized or controlled to improve or optimize (e.g., increase) transmittance and chromaticity of each color pixel element individually. In addition, various embodiments provide an NVIS filter integrated into a conventional LCD panel structure, thus not adding to the total thickness of an LCD device.

In certain embodiments, an NVIS compatible LCD is provided. The NVIS compatible LCD can comprise a backlight and an LCD panel. The LCD panel can comprise a color filter comprising a plurality of colored pixels. Each of the colored pixels in the plurality of colored pixels can comprise a binder resin, a visible absorber, and an NIR absorber. The visible absorber can have an absorption maximum at a wavelength within a range from 400 nm to 700 nm. The NIR absorber can have an absorption maximum at a wavelength within a range from 650 nm to 930 nm. Each of the colored pixels in the plurality of colored pixels can be configured to transmit a band of visible light and substantially block NIR radiation received from the backlight such that visible light can be seen by the user viewing the display.

In various embodiments, the color filter can block over 80% of incident radiation having wavelength ranging from approximately 650 nm to 930 nm. The color filter can, in some instances, provide NVIS filtering compliance to MIL-STD-3009 without supplemental filtering. In some embodiments, the colored pixels comprise red, green and blue colored pixels. For example, a blue colored pixel can be configured to transmit a band of visible light from approximately 430 nm to approximately 480 nm. A green colored pixel can be configured to transmit a band of visible light from approximately 490 nm to approximately 560 nm. A red colored pixel can be configured to transmit a band of visible light from approximately 600 nm to approximately 650 nm.

In some embodiments, the visible absorber can comprise a pigment or dye, dispersed in the binder resin. In some embodiments, the NIR absorber can comprise a pigment or dye, dispersed in the binder resin. The NIR absorber in certain embodiments can be different for the red, green and blue colored pixels such that the respective NIR absorber has differently shaped absorption spectra for the red, green and blue colored pixels. The colored pixels can comprise at least one color balancing dye. The binder resin can comprise a photosensitive resin comprising a photo polymerizable monomer and a polymerization initiator. The binder resin can comprise an acrylic resin.

In certain embodiments, an NVIS color filter is provided. The NVIS color filter can comprise at least one colored pixel. The at least one colored pixel can include a binder, a first material dispersed in the binder, and a second material dispersed in the binder. The first material can be configured to selectively transmit a band of visible light within a range from 400 nm to 650 nm and to selectively absorb light outside the band of visible light within the range from 400 nm to 650 nm. The second material can be configured to selectively transmit a band of visible light within a range from 400 nm to 650 nm and to selectively absorb light having a wavelength ranging from 650 nm to 930 nm. The filter can be configured to have a visible light transmission of at least 40% within the band of visible light.

In various embodiments, the color filter can block at least 80% of incident radiation having wavelength ranging from 650 nm to 930 nm. In some instances, the first material has a maximum absorbance value at a wavelength within the range from 400 nm to 700 nm, and the second material has a maximum absorbance value at a wavelength within the range from 650 nm to 930 nm. In addition, the second material can have a further maximum absorbance value at a wavelength within the range from 430 nm to 600 nm. In some such embodiments, a ratio of the maximum absorbance value within the range from 650 nm to 930 nm for the second material to the maximum absorbance value within the range from 430 nm to 600 nm for the second material is at least 7.

In some embodiments, the first or second material can comprise a pigment or dye, dispersed in the binder. The at least one colored pixel in some embodiments can comprise red, green and blue colored pixels. For example, a blue colored pixel can be configured to transmit a band of visible light from 430 nm to 480 nm. A green colored pixel can be configured to transmit a band of visible light from 490 nm to 560 nm. A red colored pixel can be configured to transmit a band of visible light from 600 nm to 650 nm.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the inventive concepts are not limited to the precise arrangements and instrumentalities shown.

In the drawings.

DETAILED DESCRIPTION

Certain embodiments will now be described more fully with reference to the figures. It is to be understood that the figures and descriptions of certain embodiments of the present disclosure have been simplified to illustrate elements that are relevant for clear understanding and best practice of the inventive concepts.

Figure 1:
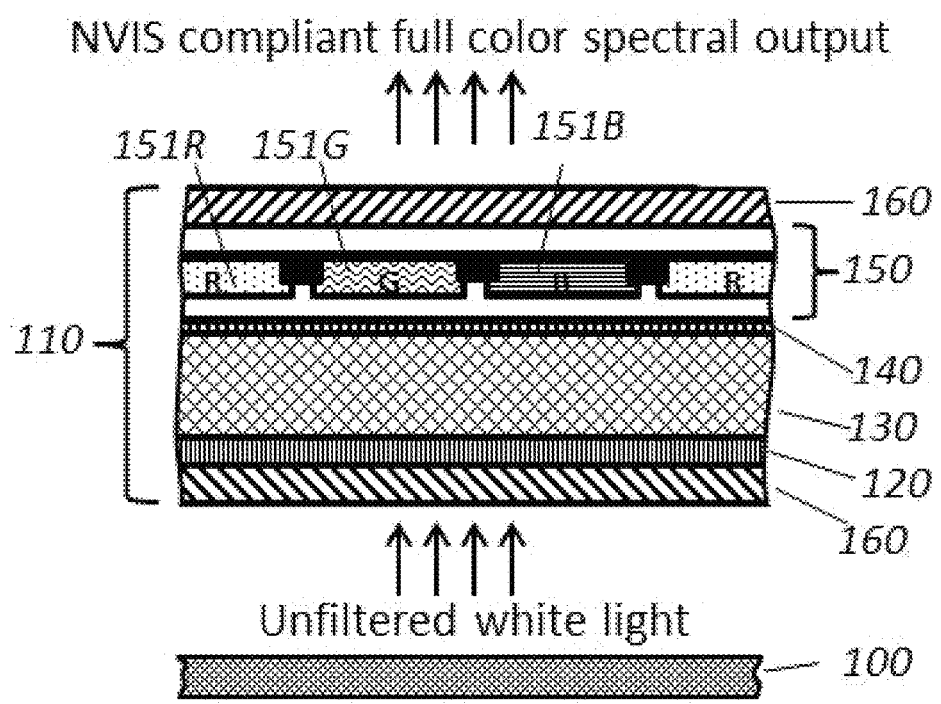
FIG. 1 illustrates is a cross sectional schematic view of an NVIS-compatible liquid crystal display in accordance with certain embodiments of the present disclosure.

FIG. 1 shows a cross sectional schematic view of an NVIS-compatible LCD display in accordance with certain embodiments of the present disclosure. The example LCD display includes a backlight 100 and an LCD panel 110. When illuminated with the backlight 100, the LCD panel 110 provides a night vision imaging system (NVIS) compliant full color spectral output by controlling color and brightness of the incident light, while at the same time attenuating NIR emission from the backlight.

Still referring to FIG. 1, the LCD panel 110 includes a thin-film-transistor (TFT) plate 120, a liquid crystal material 130, a common electrode 140 and a color filter layer 150, all sandwiched between two polarizer layers 160. In some embodiments, the improvements disclosed herein are realized by fabricating the color filter layer 150 capable of substantially blocking emissions from a backlight 100, including NIR emission between 650 nm and 930 nm, while maintaining high transmission of bands, e.g., predetermined bands such as color bands like red, green, and blue, etc., of visible light for producing a full color visual image. In accordance with various embodiments, the color filter 150 includes a NIR absorbing material, that selectively absorbs light in NVIS sensitive region from approximately 650 nm to approximately 930 nm, while at the same time, has spectral characteristics in the visible part of the spectrum that allows preserving visible light transmission (VLT) of the color filter.

Referring to FIG. 1, in some embodiments, the NIR absorbing material is contained in the color filter layer 150 and is internal to the LCD panel 110. Unlike the assembly practiced in the prior art, the LCD display described in accordance with certain embodiments in the present disclosure does not require a NIR absorbing filter that is external to the LCD panel 110 or NVIS compatible backlight when used by personnel wearing night vision goggles (NVG). In such embodiments, the improvements disclosed herein simplify the design of NVIS compliant LCD display and eliminate additional costs associated with manufacturing and assembly of an external NVIS filter or backlight.

Figure 2:
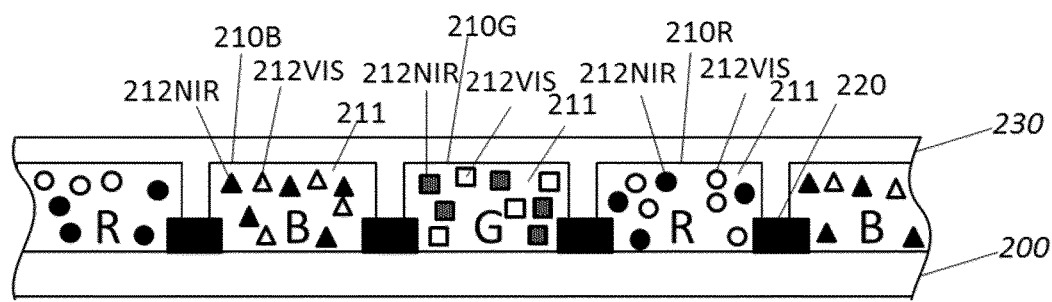
FIG. 2 illustrates a cross sectional view of an NVIS color filter in accordance with various embodiments of the present disclosure.

FIG. 2 shows a cross-sectional view of a color filter layer manufactured in accordance with various embodiments of the present disclosure. The color filter includes a plurality of red 210R, green 210G and blue 210B color filters that are arranged in a pattern on a transparent substrate 200. Each of the red, green and blue color filters 210R, 210G, and 210B, respectively corresponds to one pixel. Colored pixels are preferably the three primary colors: red (R), green (G) and blue (B) but may include a single color for a monochrome display or a color other than red, green and blue. Each of the pixels in certain embodiments is separated by a space, which is filled with a black matrix material 220. The black matrix prevents light from leaking and increases contrast. An overcoat layer 230 in some embodiments covers the pixels and fills the spaces between them and serves as planarization and insulation layer. In various embodiments, each of the pixels is comprised of a binder resin 211 and light absorbing material 212 dispersed in said resin. In some instances, the light absorbing material 212 is a mixture of organic or inorganic dyes or pigments.

Light absorbing material 212 used in the color filter in accordance with certain embodiments of the present disclosure includes visible absorber 212VIS, having an absorption peak, band or maximum at a wavelength within a range from 400 nm to 700 nm and configured to transmit light of a band of visible light, e.g., a predetermined band of visible light. Further, in some embodiments, the light absorbing material 212 includes NIR absorber 212NIR effective for absorbing light having wavelength ranging from approximately 650 nm to 930 nm. The composition of the absorber material, e.g., the amounts and spectral characteristics of visible 212VIS and NIR absorbers 212NIR used in each primary color pixel can be controlled so that light output from the LCD panel 110 when illuminated with the backlight 100 can be compliant to NVIS requirements (e.g., as defined by MIL-STD-3009) and that the light output can provide a full color visual image.

As will be appreciated from the foregoing description, one of the advantages of certain embodiments is the provision of an NVIS compatible LCD display having a visible light transmittance value greater than the VLT of an NVIS display employing commercially available external NVIS dye based filtering technology. The improvement of the VLT is realized in certain embodiments because 1) the NIR absorber is formulated differently for each primary color pixel and 2) the amounts and spectral characteristics of both visible and NIR absorbers are customized or controlled to optimize or improve (e.g., increase) transmittance and chromaticity of each colored pixel individually.

In one embodiment, the NIR absorber has high transparency in the 400 nm to 600 nm region, while having the capability of substantially blocking NIR radiation in the region from approximately 650 nm to 930 nm. In other words the NIR absorber exhibits an NIR-to-visible ratio, calculated by dividing the maximum absorbance value obtained in the region from 650 nm to 930 nm by the maximum absorbance value obtained in the region from 430 nm to 600 nm, of 7 or more.

In another embodiment, the NIR absorber used in each primary color pixel of the color filter of certain embodiments of the present disclosure has spectral characteristics in the visible part of the spectrum from 400 nm to 650 nm consistent with spectral characteristics of the visible absorber used in the same primary color pixel, while having the capability of substantially blocking NIR radiation in the region from approximately 650 nm to 930 nm. In other words, spectral characteristics in the visible part of the spectrum from 400 nm to 650 nm of visible and NIR absorbers used in each primary color pixel can be controlled so that the pixel selectively transmits only a predetermined band of visible light. In other words, transmittance of the NIR absorber in the spectral region from approximately 400 nm to 650 nm combined with transmittance of the visible absorber in the spectral region from approximately 400 nm to 650 nm results in transmittance of the absorber material that only allows passing one predetermined band (e.g., color) of visible light. In some embodiments, such predetermined band of visible light is a band from approximately 430 nm to approximately 480 nm for a blue pixel, a band from approximately 490 nm to approximately 560 nm for a green pixel; and a band from approximately 600 nm to approximately 650 nm for a red pixel.

In one embodiment, the composition of the absorber material used in a blue pixel is controlled so that transmittance through the blue pixel is 18% or more at a wavelength of 460 nm; and transmittance is 4% or less for light having wavelengths between 535 nm and 930 nm. In another embodiment, the composition of the absorber material used in a blue pixel is controlled so that transmittance through the blue pixel is 35% or more at a wavelength of 460 nm; and transmittance is 8% or less at 535 nm; and transmittance is less than 2% for light having wavelengths between 650 nm and 910 nm. In another embodiment, the composition of the absorber material used in a blue pixel is controlled so that transmittance through the blue pixel is 65% or more at a wavelength of 460 nm; and transmittance is 15% or less at 535 nm; and transmittance is less than 2% for light having wavelengths between 650 nm and 910 nm.

In one embodiment, the composition of the absorber material used in a green pixel is controlled so that transmittance through the green pixel is 20% or more at a wavelength of 535 nm; and transmittance is 2% or less at a wavelength of 450 nm and for light having wavelengths between 650 nm and 910 nm. In another embodiment, the composition of the absorber material used in a green pixel is controlled so that transmittance through the green pixel is 35% or more at a wavelength of 535 nm; and transmittance is 3% or less at a wavelength of 450 nm; and transmission is less than 2% for light having wavelengths between 650 nm and 910 nm. In another embodiment, the composition of the absorber material used in a green pixel is controlled so that transmittance through the green pixel is 60% or more at a wavelength of 535 nm; and transmittance is 5% or less at a wavelength of 450 nm; and transmission is less than 2% for light having wavelengths between 650 nm and 910 nm.

In another embodiment, the composition of the absorber material used in a red pixel is controlled so that transmittance through the red pixel is 15% or more at a wavelength of 600 nm; and transmission is 1% or less for light having wavelength between 450 nm and 560 nm; and transmission is less than 2% for light having wavelength between 650 nm and 910 nm.

Figure 3:
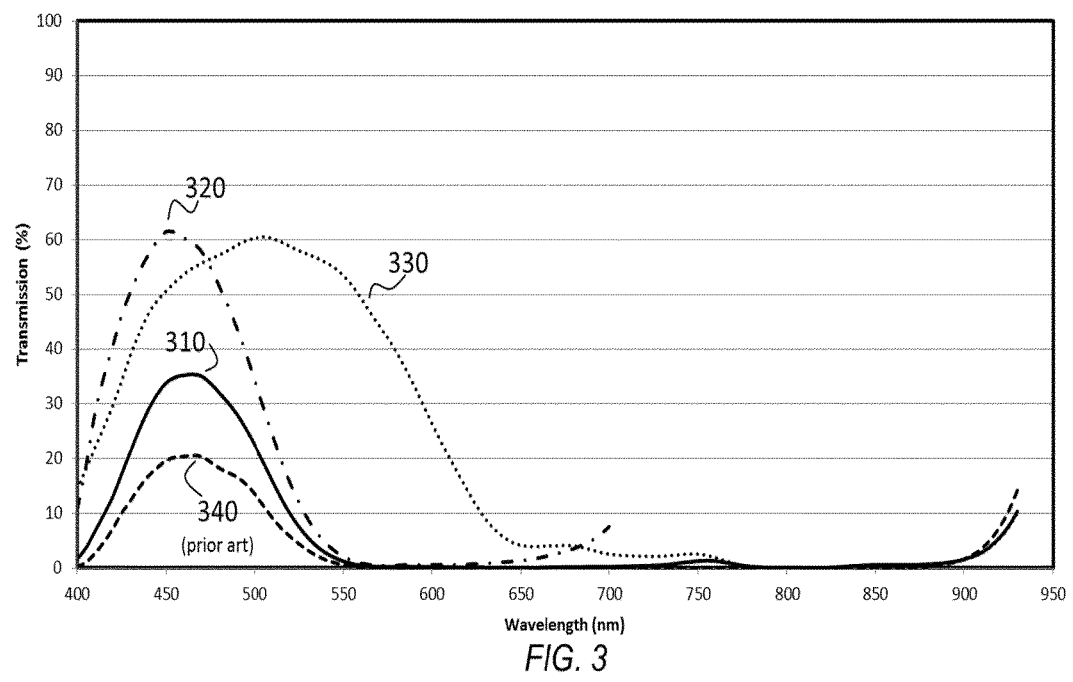
FIG. 3 is a graph showing filtering characteristics of a blue pixel according to one illustrative embodiment of the present disclosure and light transmission characteristics of a blue pixel according to prior art assembly.

FIG. 3 shows filtering characteristics, represented by line 310, of the blue pixel of the color filter according to one illustrative embodiment of the present disclosure. The blue pixel is formed using a combination of visible absorber having spectral transmittance represented by line 320 and NIR absorber having spectral transmittance represented by line 330. Also shown in FIG. 3 is light transmission characteristics, represented by line 340, of a blue pixel of a conventional LCD color filter equipped with commercially available external NVIS dye based filter. As can be seen from FIG. 3, this combination provides the filter that selectively transmits only visible light in the blue part of the visible spectrum (425-475 nm) and blocks more than 99% of light in NVIS sensitive part of the spectrum (650-930 nm). When compared with transmission characteristics of the prior art assembly, the blue pixel of the example color filter of the present disclosure allows to pass more visible blue light, while being equally efficient in blocking NIR light.

Figure 4:
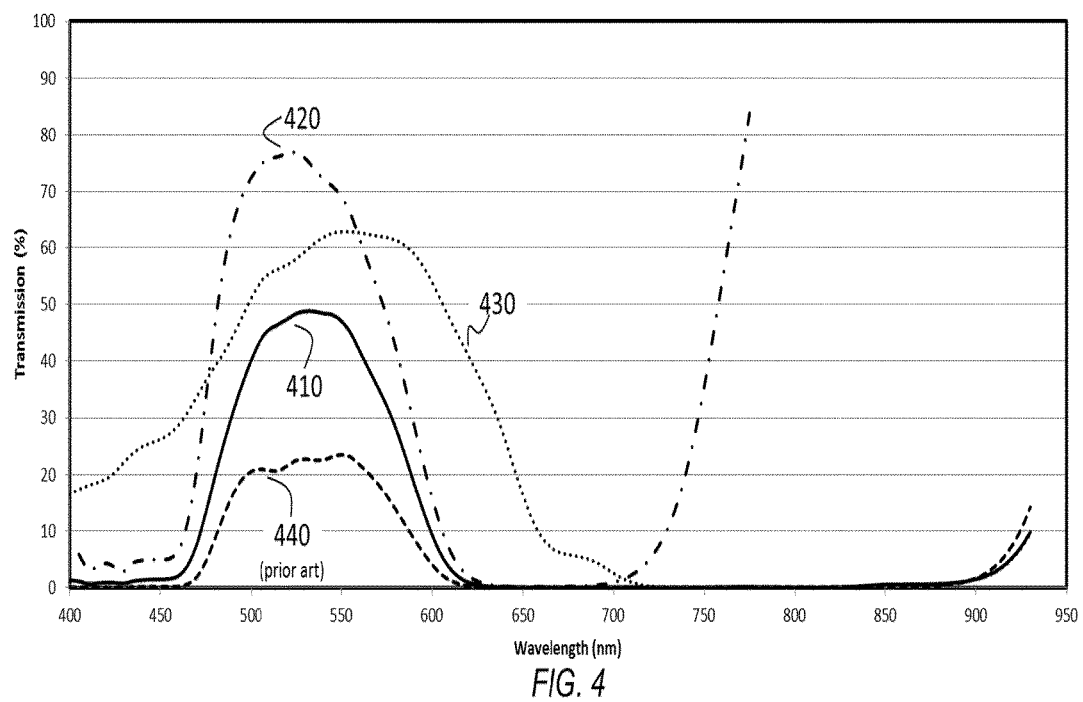
FIG. 4 is a graph showing filtering characteristics of a green pixel according to one illustrative embodiment of the present disclosure and light transmission characteristics of a green pixel according to prior art assembly.

FIG. 4 shows filtering characteristics, represented by line 410, of the green pixel of the color filter according to one illustrative embodiment of the present disclosure. The green pixel is formed using a combination of visible absorber having spectral transmittance represented by line 420 and NIR absorber having spectral transmittance represented by line 430. Also shown in FIG. 4 is light transmission characteristics, represented by line 440, of a green pixel of a conventional LCD color filter equipped with commercially available external NVIS dye based filter. As can be seen from FIG. 4, this combination provides the filter that selectively transmits only visible light in the green part of the visible spectrum (505-555 nm) and blocks more than 99% of light in NVIS sensitive part of the spectrum (650-930 nm). When compared with transmission characteristics of the prior art assembly, the green pixel of the example color filter of the present disclosure allows to pass more visible green light, while being equally efficient in blocking NIR light.

Figure 5:
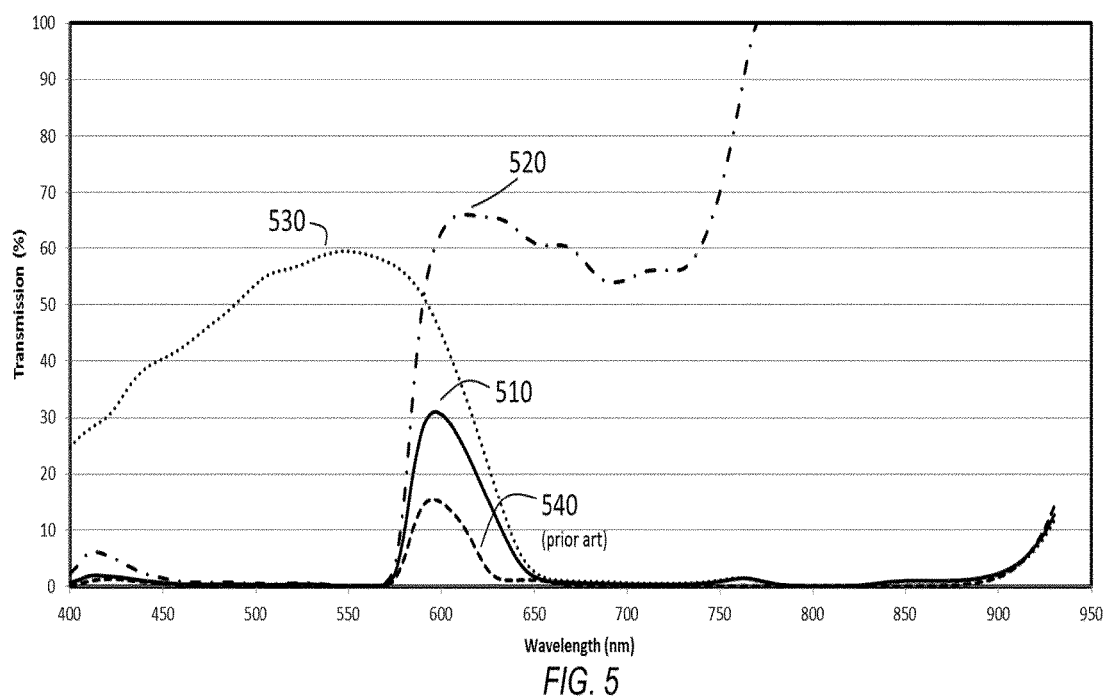
FIG. 5 is a graph showing filtering characteristics of a red pixel according to one illustrative embodiment of the present disclosure and light transmission characteristics of a red pixel according to prior art assembly.

FIG. 5 shows filtering characteristics, represented by line 510, of the red pixel of the color filter according to one illustrative embodiment of the present disclosure. The red pixel is formed using a combination of visible absorber having spectral transmittance represented by line 520 and NIR absorber having spectral transmittance represented by line 530. Also shown in FIG. 5 is light transmission characteristics, represented by line 540, of a red pixel of a conventional LCD color filter equipped with commercially available external NVIS dye based filter. As can be seen from FIG. 5, this combination provides the filter that selectively transmits only visible light in the red part of the visible spectrum (575-630 nm) and blocks more than 99% of light in NVIS sensitive part of the spectrum (650-930 nm). When compared with transmission characteristics of the prior art assembly, the red pixel of the example color filter of the present disclosure allows to pass more visible red light, while being equally efficient in blocking NIR light.

Table 1 is a summary of visible light transmission (VLT) and chromaticity coordinates of each color pixel of a color filter according to one illustrative embodiment of the present disclosure and of a conventional LCD color filter equipped with commercially available external NVIS dye based filter. When compared to the prior art, the example from the present disclosure represents over 2 times VLT improvement, while have similar chromaticity coordinates for the three primary color elements.

TABLE 1

| Color pixel | | PRIOR ART (External polymeric NVIS filter) | EXAMPLE IN PRESENT DISCLOSURE (NVIS color filter in-pixel NVIS filter) | |
|---|---|---|---|---|
| Blue | x | .133 | .135 | 2 times VLT improvement |
|  | y | .127 | .127 |  |
|  | Y % | 2.7 | 5.3 |  |
| Green | x | .288 | .283 | 2.1 times VLT improvement |
|  | y | .600 | .585 |  |
|  | Y % | 15.2 | 31.5 |  |
| Red | x | .578 | .600 | 2.2 times VLT improvement |
|  | y | .361 | .361 |  |
|  | Y % | 3.2 | 7.0 |  |

One of the advantages of certain embodiments of the present disclosure is the reduction of the complexity of the NVIS compatible LCD. The color filter and LCD display of various embodiments of the present disclosure can be manufactured by any of the techniques practiced in conventional art. In various embodiments, the manufacturing process does not require additional processing steps necessary to incorporate external NVIS filter or dual backlight assembly.

Performances of a prototype NVIS LCD device manufactured in accordance with various embodiments of the present disclosure are summarized in Table 2.

TABLE 2

| LCD mode | Chromaticity (CIE 1931) | | NRb | NRb limit according to MIL-STD-3009 |
|---|---|---|---|---|
|  | x | y |  |  |
| Red | 0.591 | 0.366 | 6.32E−9 | 1.1E−8 |
| Green | 0.312 | 0.575 | 6.24E−11 | 1.1E−8 |
| Blue | 0.145 | 0.069 | 2.82E−9 | 1.1E−8 |
| White | 0.283 | 0.306 | 1.64E−9 | 2.2E−8 |

NRb = NVIS radiance requirements for Class B equipment (as defined in MIL-STD-3009)

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:
1. A night vision imaging system (NVIS) compatible liquid crystal display (LCD) comprising:
 a backlight; and
 an LCD panel, the LCD panel comprising
  a color filter comprising a plurality of colored pixels, each of said colored pixels in said plurality of colored pixels comprising:
  binder resin;
  a visible absorber having an absorption maximum at a wavelength within a range from 400 nm to 700 nm; and
  a near infrared (NIR) absorber having an absorption maximum at a wavelength within a range from 650 nm to 930 nm;
  wherein each of said colored pixels in said plurality of colored pixels is configured to transmit a band of visible light and substantially block NIR radiation received from said backlight.

2. The NVIS compatible LCD of claim 1, wherein the color filter blocks over 80% of incident radiation having wavelength ranging from approximately 650 nm to 930 nm.

3. The NVIS compatible LCD of claim 1, wherein the color filter provides NVIS filtering compliance to MIL-STD-3009 without supplemental filtering.

4. The NVIS compatible LCD of claim 1, wherein the colored pixels comprise red, green and blue colored pixels.

5. The NVIS compatible LCD of claim 4, wherein said blue colored pixel is configured to transmit a band of visible light from approximately 430 nm to approximately 480 nm, said green colored pixel is configured to transmit a band of visible light from approximately 490 nm to approximately 560 nm, and said red colored pixel is configured to transmit a band of visible light from approximately 600 nm to approximately 650 nm.

6. The NVIS compatible LCD of claim 1, wherein the visible absorber comprises a pigment or dye, dispersed in the binder resin.

7. The NVIS compatible LCD of claim 1, wherein the NIR absorber comprises a pigment or dye, dispersed in the binder resin.

8. The NVIS compatible LCD of claim 1, wherein the NIR absorber is different for the red, green and blue colored pixels such that the respective NIR absorber has differently shaped absorption spectra for the red, green and blue colored pixels.

9. The NVIS compatible LCD of claim 1, wherein said colored pixels further comprise at least one color balancing dye.

10. The NVIS compatible LCD of claim 1, wherein the binder resin comprises a photosensitive resin comprising a photo polymerizable monomer and a polymerization initiator.

11. The NVIS compatible LCD of claim 1, wherein the binder resin comprises an acrylic resin.

* * * * *